H. A. BECKER.
COMBINATION SPRING AND SHOCK ABSORBER.
APPLICATION FILED DEC. 17, 1919.
1,398,929.
Patented Nov. 29, 1921.
2 SHEETS—SHEET 1.
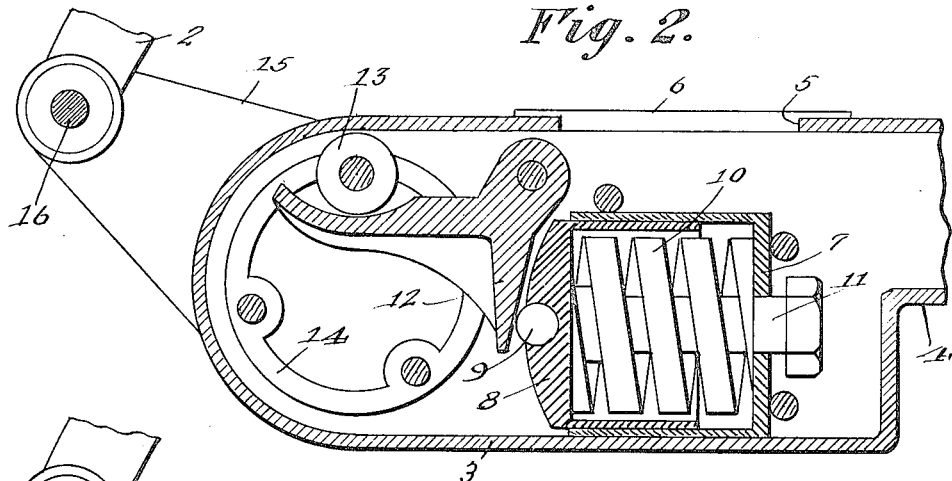
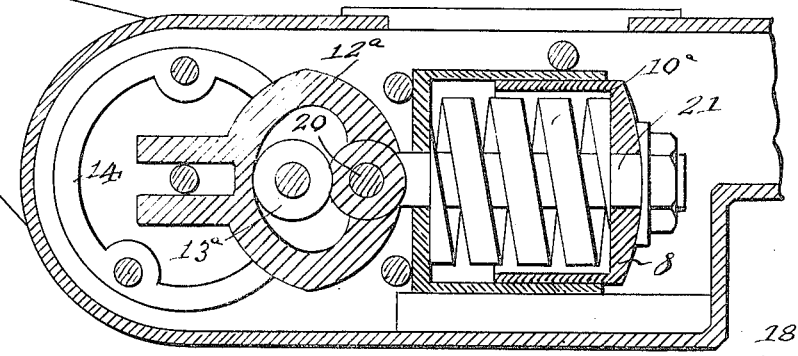
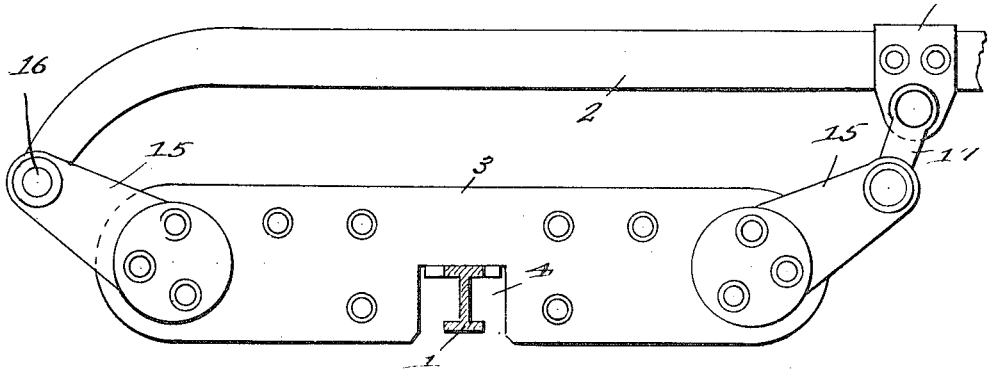
Inventor
H. A. Becker
By Victor J. Evans
Attorney H. A. BECKER.
COMBINATION SPRING AND SHOCK ABSORBER.
APPLICATION FILED DEC. 17, 1919.
1,398,929.
Patented Nov. 29, 1921.
2 SHEETS—SHEET 2.
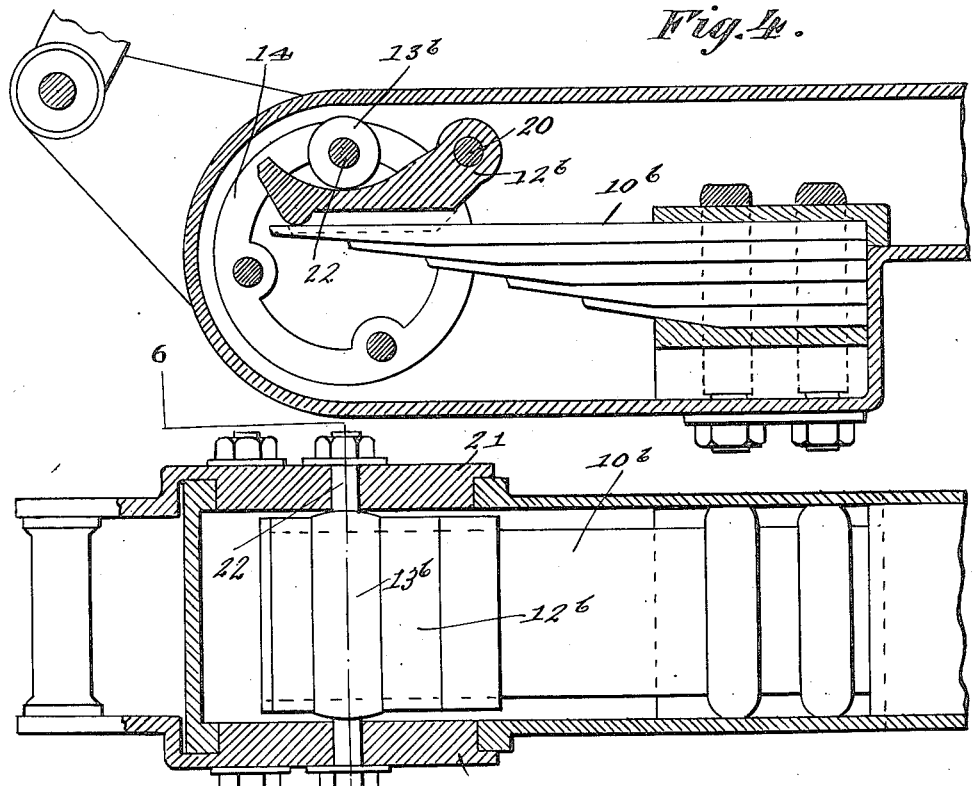
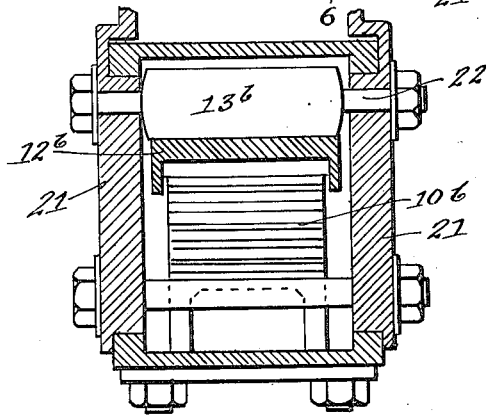
Inventor
H. A. Becker.
By 
Attorney

UNITED STATES PATENT OFFICE.

HUGO A. BECKER, OF BALTIMORE, MARYLAND, ASSIGNOR OF FORTY-FIVE PER CENT. TO GEORGE A. AMAN, OF BALTIMORE, MARYLAND, AND TWENTY-FIVE PER CENT. TO FRANK HUART, OF BALTIMORE, MARYLAND.

COMBINATION SPRING AND SHOCK-ABSORBER.

1,398,929.              Specification of Letters Patent.          Patented Nov. 29, 1921.

Application filed December 17, 1919. Serial No. 345,501.

*To all whom it may concern:*

Be it known that I, HUGO A. BECKER, a subject of the King of England, residing at Baltimore, in the county of Baltimore and State of Maryland, have invented new and useful Improvements in Combination Springs and Shock-Absorbers, of which the following is a specification.

The object of my present invention is the provision of an improved construction of shock absorber which, by reason of its construction, is possessed of a double-acting capacity of function and is otherwise highly efficient in preventing the transmission of shocks and jars.

To the attainment of the foregoing, the invention consists in the improvement as hereinafter described, and definitely claimed.

In the accompanying drawings, hereby made a part hereof:

Figure 1 is a view illustrating the application of the best practical embodiment of my invention of which I am cognizant.

Fig. 2 is an enlarged detail longitudinal vertical section of a part of the absorber.

Fig. 3 is a similar view of a modification.

Fig. 4 is a similar view of another modification.

Fig. 5 is a horizontal section of the latter.

Fig. 6 is a transverse section taken in the plane indicated by the line 6—6 of Fig. 5, with some parts in elevation.

Similar numerals designate corresponding parts in Figs. 1 and 2, to which reference will first be made.

I have elected to illustrate my improvement in combination with an axle 1, and a chassis or frame portion 2 of an automobile, and among other elements the absorber includes a casing 3, recessed at 4 to rest over the axle to which it is affixed in any approved manner. The opposite end portions of the casing 3 are similar in construction, and each end portion is similarly equipped, and therefore a detailed description of the end portion of the casing and the equipment thereof as illustrated in Fig. 2, will suffice to impart a definite understanding of both end portions. By reference to the end casing portion shown in Fig. 2, it will be noted that the same is provided with an opening 5, designed for the introduction of oil, and normally closed by a cap 6. It will also be noted that a cylinder 7 is secured in the said casing portion, and in said cylinder is a piston 8 that carries an anti-friction ball 9 and is backed by a spring 10. The piston 8 is also provided with a rod 11, guided in the cylinder 7 and adapted to assist in assuring true rectilinear movements of the piston. Opposed to the anti-friction ball 9 on the piston 8, is one arm of a crank 12, the other arm of which is opposed to a gudgeon 13, preferably in the form of an anti-friction roller, that is carried in and by a rocking body 14. Said rocking body 14 is of circular form in cross-section, is journaled in the casing 3, and is provided exteriorly of the casing with a crank arm 15. The crank arm 15 at one end of the casing 3 is preferably connected in pivotal manner to the frame or chassis portion 2, as indicated by 16 in Fig. 1, and the crank arm 15 at the opposite end of the casing 3 is preferably connected through the medium of a link 17 with a bracket 18, fixed on the chassis portion 2.

When it is stated with reference to the foregoing that the equipments at the opposite ends of the casing 3 are reversely arranged, it will be understood that when the chassis portion 2 is thrust downwardly or is moved upwardly relatively to the casing 3, the said movements will be cushioned by the cushioning means or springs 10, and all shock and jar will be adequately taken up.

In the modification shown in Fig. 3, I employ in lieu of the crank-like compressing member 12 of Fig. 2, a cam-like compressing member 12$^a$, said member 12$^a$ being pivotally connected at 20 to the rod 21 of the piston 8, which piston is subject to the action of the spring 10$^a$. The said spring-compressing member 12$^a$ receives the gudgeon 13$^a$ on the rocking body 14, and manifestly the operation of the modification will be similar to the operation of the embodiment shown in Fig. 2.

In the embodiment shown in Figs. 4, 5 and 6, a leaf spring 10$^b$ is employed as the cushioning means, and is opposed directly to the action of a spring-compressing member 12$^b$, which is in the form of a swinging arm, pivoted at 20 and opposed to a gudgeon 13$^b$ on the rocking member 14. This latter construction, the details of which are clearly brought out in Figs. 4, 5 and 6, is at once simple, compact, highly efficient and durable. In said construction the flanged heads 21 of the rocking body are connected together by transverse bolts 22, and on one of said bolts the gudgeon 13$^b$ is mounted between the flanged heads so as to act against the arm 12$^b$, which is arranged to play between the said flanged heads 21.

The embodiments illustrated for carrying my invention into effect, are the best embodiments of which I am aware, but I do not desire to be understood as confining myself to any one of the specific constructions shown and described, inasmuch as various changes may be made in the future practice of the invention without involving departure from the scope of my appended claims.

I would also have it understood that my novel device is susceptible of use to advantage as a substitute for springs, and is also adapted to be used in combination with springs of the ordinary type or of any other type compatible with the purpose of my improvement.

Having described my invention, what I claim and desire to secure by Letters-Patent, is:

1. In a shock absorber, the combination of a casing adapted to be connected with an axle, a transverse body of circular form in cross-section journaled and rockable about its axis in said casing and extending beyond one side thereof, a gudgeon carried by said body off the center thereof, a crank fixed to said body exteriorly of the casing and adapted to be connected with a chassis or frame portion, movable means mounted within the casing and against which said gudgeon is arranged to work, and means within the casing to yieldingly resist movement of said movable means in one direction.

2. In a shock absorber, the combination of a casing, a body of circular form in cross section journaled and rockable about its axis in said casing, a gudgeon carried by said body off the center thereof, movable means mounted within the casing and against which said gudgeon is arranged to work, and means within the casing to yieldingly resist movement of said movable means in one direction.

3. The combination in a shock absorber, of supporting means, a body of circular form in cross section journaled and rockable about its axis in said supporting means, a gudgeon carried by said body off the center thereof, movable means carried by the supporting means and against which said gudgeon is arranged to work, and means also carried by the supporting means to yieldingly resist movement of said movable means in one direction.

In testimony whereof I affix my signature.

HUGO A. BECKER.